July 4, 1967

H. LUDWIG 3,328,845

METHOD AND APPARATUS FOR FORMING AND ATTACHING
ELASTOMERIC BOTTOMS TO FOOTWEAR

Filed Oct. 5, 1965

INVENTOR.
Herbert Ludwig
BY
Roberts, Cushman & Grover
ATT'YS

United States Patent Office

3,328,845
Patented July 4, 1967

3,328,845
METHOD AND APPARATUS FOR FORMING AND ATTACHING ELASTOMERIC BOTTOMS TO FOOTWEAR
Herbert Ludwig, Desmastr. 112, Uesen, near Bremen, Germany
Filed Oct. 5, 1965, Ser. No. 493,073
7 Claims. (Cl. 18—30)

ABSTRACT OF THE DISCLOSURE

A tubular nozzle provided with a plurality of equally spaced orifices movable from a lateral position between the bottom of a last on which an upper is mounted and the open top of a mold cavity for depositing substantially equal amounts of bottom-forming composition at regularly spaced intervals in the open cavity of the mold.

---

Considerable pressure is required to effect injection of the elastomer into a closed mold in such fashion as to obtain distribution throughout the entire mold cavity, that is, all the way to the peripheral edge of the cavity and into the corners to insure forming a bottom which is free of voids and is a sharp reproduction of the mold cavity especially at the peripheral edge. High pressure must also be applied to the last to hold it against the side ring to prevent leakage of the elastomer between the bottom of the upper and the lip of the mold. However the pressures that can be employed are limited by damage to the last and to the upper material. Moreover lateral flow of the elastomer within the mold cavity from one end toward the other or from the center toward the sides tends to lift the lasting margin away from the bottom of the last and/or the insole no matter how securely the margin is lasted. The objects of this invention are, accordingly, to distribute the bottom-forming composition in the mold cavity over the entire area of the cavity by depositing it in the open top of the cavity thereby eliminating the need for high pressure injection and of applying high pressure to the last to hold it against the lip of the side ring; to distribute the bottom-forming composition in the mold cavity sufficiently uniformly and in such quantity that very little lateral flow is required to conform it to the shape of the cavity even to the farthest recesses therein and to the bottom of the upper; and to compact the bottom-forming composition without requiring excessive pressure between the last bottom and the lip of the mold and hence without damage to the last or upper material and without formation of flash.

As herein illustrated, the foregoing is achieved by means of a mold assembly comprised of a last, a side ring and a sole plate wherein the last and sole plate are movable relative to the side ring and to each other to permit raising the last above the ring and lowering the sole plate within the ring to provide an enlarged cavity accessible at the top, and of means movable into a position between the raised last and the open top of the mold cavity for distributing a bottom-forming composition uniformly over the entire area of the cavity in sufficient quantity to form a bottom of the desired thickness. The means for distributing the bottom-forming composition is an elongated member movable into a position between the last and the open top of the mold ring which embodies a plurality of discharge orifices through which the bottom-forming composition is adapted to be ejected into the mold cavity. The distributor member is in the form of one or more hollow nozzles connected at one end to a source of bottom-forming composition and closed at the other end, and each orifice comprises a hollow fitting screwed into the nozzle through which the bottom-forming composition is discharged. Each fitting may be adjustable to control the flow of bottom-forming composition and certain of the fittings are inclined so as to effect distribution laterally toward the periphery of the mold cavity. Optionally, closure members are mounted adjacent the open ends of the fittings and these are operable to open or close the orifices when required.

In accordance with the method of operation, the last is raised above the side ring, the sole plate is lowered within the side ring to provide an open top mold cavity, the distributor is moved into a position between the bottom of the last and the open top of the side ring, the bottom-forming composition is ejected by the distributor into the mold cavity uniformly throughout its entire area, the distributor is withdrawn, the last is lowered into engagement with the lip of the side ring and then the sole plate is raised to apply pressure to the bottom-forming composition to shape it and attach it to the bottom of the upper.

The invention will now be described in greater detail with reference to the accompanying drawings wherein.

Figure 1:
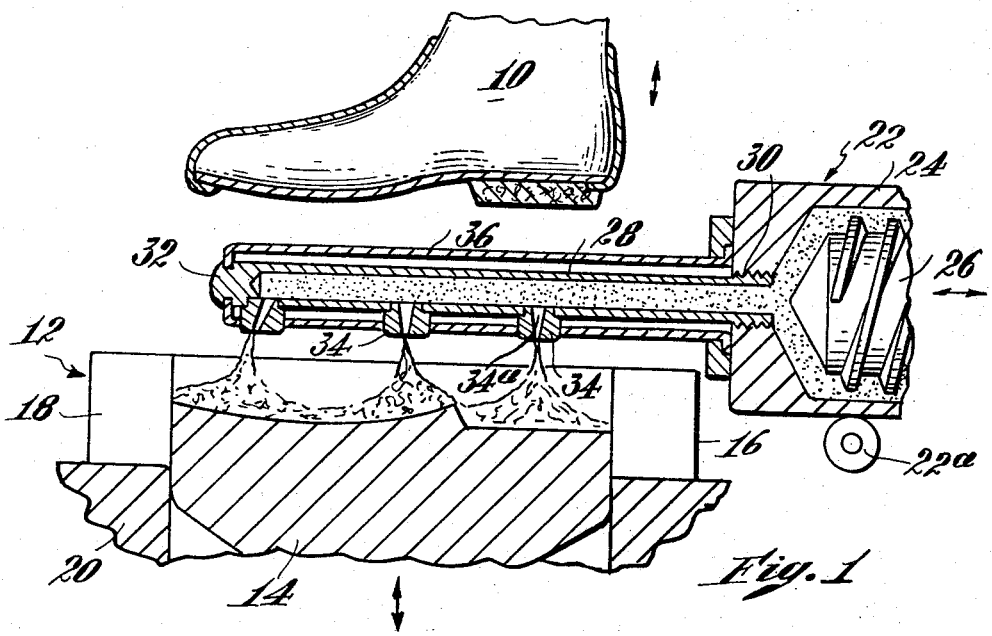
FIG. 1 is a fragmentary vertical section through a mold assembly showing the lasted upper raised above the open top of the mold, with the sole plate lowered and with a distributor positioned between the lasted upper and the open top of the side ring, embodying a single nozzle, for deposit of bottom-forming composition into the mold cavity.

Referring to the drawings, the mold assembly herein illustrated comprises a last 10, a side ring 12 and a sole plate 14. The last 10 is supported above the side ring for movement from a position above the side ring to a position in engagement with the top of the side ring, for example as shown in Patent No. 2,878,532, dated Mar. 24, 1959. The side ring comprises two halves 16—16 having interfaces 18 and the halves are supported by a support 20 for movement into engagement to provide, in conjunction with the sole plate, a mold cavity and away from each other to permit the finished shoe to be removed. Mechanism similar to that shown in the aforesaid patent may be provided for moving the mold halves into and out of operative position. The sole plate 14 is movable within the side ring relative to the bottom of the last so that it may be lowered to provide a mold cavity of sufficient size to receive the uncompressed bottom-forming composition and thereafter raised to apply pressure to the bottom-forming composition after the lasted upper has been lowered into engagement with the top of the side ring. Movement of the sole plate may be effected in the same manner as illustrated in the aforesaid patents or in Patent No. 3,018,517, dated Jan. 30, 1962.

Figure 2:
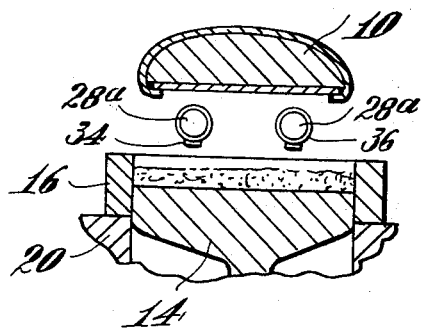
FIG. 2 is a section taken transversely of a mold assembly wherein the distributor embodies two nozzles parallel to each other.

In accordance with this invention, a distributor unit 22 is provided for depositing bottom-forming composition into the open top of the mold cavity as distinguished from injection through the side ring or the sole plate. The distributor unit 22 comprises a barrel 24 within which there is a feed screw 26 for preparing and ejecting a bottom-forming composition. A Foster-Yates machine or its equivalent may be employed mounted on suitable rollers or bearings 22a to enable moving the unit into and out of operative position. Instead of ejecting the bottom-forming composition directly through the usual end orifice into the side ring or sole plate, it is ejected into an elongate hollow nozzle 28 provided with threads 30 at one end by means of which it is threaded into the end of the end orifice of the barrel 24. The distal end 32 of the nozzle 28 is closed. A plurality of fittings 34 containing orifices 34a are threaded into the nozzle 28 at spaced intervals lengthwise thereof. The fittings 34 are spaced along the nozzle so as to effect a uniform distribution of the bottom-forming composition into the open mold cavity when the distributor is positioned between the raised last and the top of the side ring. As illustrated in FIG. 1, a single nozzle 28 is employed which is located substantially at the longitudinal center line of the mold cavity and preferably the fitting adjacent the distal end 32 of the tube has an orifice which is inclined forwardly so as to assist in depositing the bottom-forming composition at the far end of the mold cavity. Optionally, as shown in FIG. 2, there may be two nozzles 28a—28a disposed parallel to each other so as to assist in obtaining uniform distribution transversely of the mold cavity particularly when the bottom-forming composition is of a somewhat viscose nature. The orifices in the two nozzles may be inclined slightly, outwardly relative to the median, that is, toward the sides of the mold cavity.

A jacket 36 is disposed about the nozzle or nozzles 28 to maintain the bottom-forming composition in a plastic condition and there will of course be suitable means for moving the distributor unit 22 forwardly into a position between the last and the open mold cavity when it is desirable to fill the mold and thereafter to retract it to enable closing the mold by bringing the lasted shoe downwardly into engagement with the top of the side ring and then applying conforming and attaching pressure by raising the sole plate 14.

Figure 5:
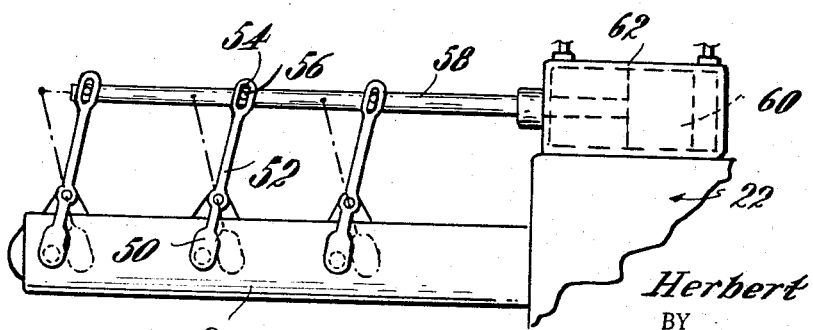
FIG. 5 is a view taken from the lower side of the distributor showing valve means for closing the orifice units.

The fittings 34 shown in FIG. 1, as previously described, contain orifices 34a through which the bottom-forming composition is ejected and to insure deposit of measured amounts valve closure members 50 are provided, as shown in FIG. 5. Each closure member 50 is supported by an arm 52 for movement from positions covering the open end of an orifice to a position uncovering it. The arms have slots 54 at their ends which fit over pins 56 secured to a piston rod 58. The piston rod 58 is connected to a piston 60 in a cylinder 62 and is reciprocable by pressure applied to the cylinder to effect opening or closing of the valve part 50 to effect discharge or cut off discharge.

Figure 3:
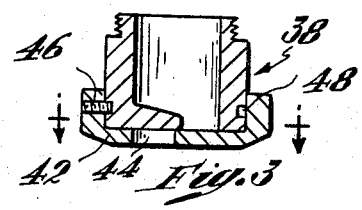
FIG. 3 is an enlarged vertical section through one of the orifice units.
Figure 4:
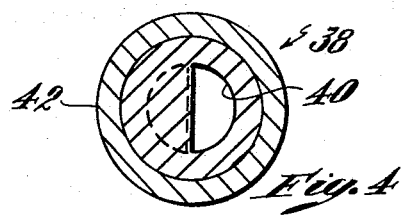
FIG. 4 is a transverse section taken on the line 4—4 of FIG. 3.

Optionally, fittings 38 may be employed which may be individually adjustable to control the flow of bottom-forming composition as shown in FIGS. 3 and 4. Each fitting 38 comprises a hollow sleeve adapted to be threaded into the nozzle 228 having at its protruding end a semicircular opening 40. A cap 42 having a semicurcular opening 44 is rotatably mounted on the protruding end of the sleeve and held in place by a screw 46 engaged with a peripheral groove 48. By rotating the cap the opening 44 may be brought into a position coinciding with the opening 40 or partially coinciding therewith to control discharge through the orifice.

The apparatus described described above provides for forming and attaching a bottom-forming composition high injection pressure as used with a closed mold, without to the bottom of the lasted upper without requiring a having to apply high pressure to the last to hold it against the top of the side ring and with a minimum amount of lateral movement of the elastomer in the mold cavity to achieve precise conformity to the mold cavity and attach it to the bottom. The foregoing is effected by means of this apparatus by first raising the last to a position above the top of the side ring, then lowering the sole plate 14 within the side ring to provide a mold cavity of greater depth than the thickness of the bottom to be formed, moving the distributor unit 22 into a position between the raised last and the lowered sole plate, making the proper adjustment of the discharge orifices and then depositing a measure quantity of bottom-forming composition into the open mold cavity. No pressure is required other than to effect an ejection of the bottom-forming composition from the nozzle or nozzles 28. Having deposited the proper quantity of bottom-forming composition the distributor is withdrawn, the lasted upper is lowered into engagement with the top of the side ring and the sole plate 14 is raised to apply pressure to form the bottom-forming composition to the contur of the mold cavity and to attach it to the bottom of the lasted upper.

It should be understood that the present disclosure is for the purpose of illustration only and that this invention includes all modifications and equivalents which fall within the scope of the appended claims.

I claim:
1. In an apparatus for forming and attaching bottoms to lasted uppers, the combination with a mold assembly comprised of a last on which is lasted an upper, a side ring and a sole plate, wherein the last and sole plate are movable relative to the ring and to each other to permit raising the last above the ring and lowering the sole plate within the ring to provide a mold cavity accessible at the top; means movable from a lateral position to a position between the bottom of the raised last and the open top of the mold cavity, said means comprising a plurality of orifices mounted in spaced relation to each other longitudinally of the mold cavity such as to distribute the bottom-forming composition into the mold cavity at a plurality of regularly spaced intervals in substantial equal quantities to effect uniform distribution over the entire area of the cavity in sufficient quantity to form a bottom of the desired thickness.

2. In an apparatus for forming and attaching bottoms to lasted uppers, the combination with a mold assembly comprised of a last on which is lasted an upper, a side ring and a sole plate, wherein the last and sole plate are movable relative to the ring and to each other to permit raising the last above the ring and lowering the sole plate within the ring to provide a mold cavity accessible at the top; a tubular distributor member movable from a lateral position to a position between the bottom of the last and the open top of the mold ring, said distributor member embodying a plurality of discharge orifices spaced at equal intervals longitudinally of the cavity through which bottom-forming composition is adapted to be ejected into the mold cavity.

3. In an apparatus for forming and attaching bottoms to lasted uppers, the combination with a mold assembly comprised of a last on which is lasted an upper, a side ring and a sole plate, wherein the last and sole plate are movable relative to the ring and to each other to permit raising the last above the ring and lowering the sole plate within the ring to provide a mold cavity accessible at the top; a distributor movable from a lateral position to a position between the bottom of the last and the open top of the mold ring, said distributor embodying a plurality of orifices mounted in spaced relation both longitudinally and transversely of the mold cavity.

4. In an apparatus for forming and attaching bottoms to lasted uppers, the combination with a mold assembly comprised of a last on which is lasted an upper, a side ring and a sole plate, wherein the last and sole plate are movable relative to the ring and to each other to permit raising the last above the ring and lowering the sole plate within the ring to provide a mold cavity accessible at the top; a distributor movable from a lateral position to a position between the bottom of the last and the open top of the mold ring, said distributor embodying a plurality of orifices mounted in spaced relation both longitudinally and transversely of the mold cavity whereon in certain of the orifices are inclined toward the sides and ends of the cavity.

5. Apparatus according to claim 2, wherein each orifice is comprised of a hollow fitting having a semicircular opening, a part rotatably mounted over said semicircular end opening, said part having a corresponding semicircular opening and being rotatable on said fitting to control the flow of bottom-forming composition through the orifice.

6. Apparatus according to claim 2, wherein the distributor comprises a hollow tube connected at one end to a source of elastomer and closed at its other end, a jacket surrounds the tube, and a plurality of fittings are screwed into the tube at spaced intervals lengthwise thereof, said fittings extending through the jacket.

7. Apparatus according to claim 2, wherein each orifice comprises a hollow fitting and a valve part is supported adjacent the protruding end of each fitting operable to control the flow of bottom-forming composition through the orifice.

References Cited

UNITED STATES PATENTS

| | | | |
|---|---|---|---|
| 305,564 | 9/1884 | Bapterosses | 18—26 X |
| 1,840,027 | 1/1932 | Fetter | 18—26 X |
| 2,689,375 | 9/1954 | Hugger | 18—26 |
| 2,862,237 | 12/1958 | Rekettye | 18—26 |

WILLIAM J. STEPHENSON, *Primary Examiner.*